United States Patent
Fan et al.

(10) Patent No.: US 6,849,297 B1
(45) Date of Patent: Feb. 1, 2005

(54) ENCAPSULATED LONG LIFE ELECTROLUMINESCENT PHOSPHOR

(75) Inventors: Chen-Wen Fan, Sayre, PA (US); Kenneth T. Reilly, Towanda, PA (US); Richard G. W. Gingerich, Towanda, PA (US); Dale E. Benjamin, Athens, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/110,982

(22) PCT Filed: Nov. 15, 2000

(86) PCT No.: PCT/US00/31216

§ 371 (c)(1),
(2), (4) Date: Sep. 16, 2002

(87) PCT Pub. No.: WO01/36559

PCT Pub. Date: May 25, 2001

Related U.S. Application Data

(60) Provisional application No. 60/166,619, filed on Nov. 19, 1999.

(51) Int. Cl.$^7$ .............................. C23C 16/40; B05D 5/06
(52) U.S. Cl. .................... 427/215; 427/64; 427/255.31; 427/255.34
(58) Field of Search ................... 427/64, 215, 255.31, 427/255.34; 428/403

(56) References Cited

U.S. PATENT DOCUMENTS

| | | | |
|---|---|---|---|
| 4,585,673 A | 4/1986 | Sigai | |
| 4,825,124 A | 4/1989 | Sigai | |
| 5,080,928 A | 1/1992 | Klinedinst et al. | |
| 5,196,234 A | 3/1993 | Taubner et al. | |
| 5,602,445 A | 2/1997 | Solanki et al. | |
| 5,605,867 A | 2/1997 | Sato et al. | |
| 5,702,643 A | * 12/1997 | Reddy et al. | ......... 252/301.6 S |

* cited by examiner

*Primary Examiner*—Michael Cleveland
(74) *Attorney, Agent, or Firm*—Robert F. Clark

(57) ABSTRACT

A process for making an electroluminescent phosphor having a given emission spectra A, comprises the steps of manufacturing a beginning electroluminescent phosphor having an emission spectra B, different than A. A coating is applied to the phosphor having the emission spectra B to increase the resistance of the phosphor to the deleterious effects of moisture and change the emission spectra of the phosphor to emission spectra A. The application of the coating includes the steps of reacting a coating precursor with a mixture of oxygen and ozone.

3 Claims, No Drawings

ENCAPSULATED LONG LIFE ELECTROLUMINESCENT PHOSPHOR

CROSS REFERENCE TO RELATED APPLICATIONS

This application claims priority from provisional application Ser. No. 60/166,619 filed Nov. 19, 1999.

TECHNICAL FIELD

This application relates to a process for producing an electroluminescent phosphor, and more particularly, to a process that produces an electroluminescent phosphor with a desired emission spectra.

BACKGROUND ART

Electroluminescent (hereinafter EL) phosphors are used for backlighting in LCD's, in copying machines, for backlighting membrane switches, for automotive dashboard and control switch illumination, for automotive exterior body lighting, for aircraft style information panels, for aircraft information lighting, and for emergency egress lighting. U.S. Pat. Nos. 3,014,873; 3,076,767; 4,859,361; 5,009,808 and 5,110,499 relate to methods for producing EL phosphors. Since EL phosphors are sensitive to moisture it is not uncommon for the phosphors to be coated with a moisture-resistant coating of a metal oxide such as alumina. Such coating processes have involved reacting the phosphor, via a chemical vapor deposition process, with a coating agent such as, for example, trimethylaluminum and water vapor. An example of such a coated phosphor is shown as Sample Number CJ564 in TABLE I and as CJ30 in TABLE II. The phosphor coating, in the first instance, contains 4.4 weight percent (hereinafter wgt. %) aluminum, has a Y color coordinate of 0.199 on the C.I.E. Chomaticity Diagram (X value, 0.158) and a half-life of 195 hours and, in the second instance, 4.0 wgt.% aluminum, a Y value of 0.203 and a half-life of 256 hours. As used herein the half-life refers to that period of time when the brightness of the phosphor decreases to ½ of its brightness at 24 hours.

A different coating process having many advantages over the TMA/water process comprises reacting a coating agent such as TMA with an oxygen-ozone mixture. This latter process is water-free; however, in some instances this process produces undesired emission changes in the phosphor. Even though such phosphors have achieved some commercial success in areas where, for example, brightness might be more desirable than a particular emission spectra, it would be an advance in the art to provide a process for achieving a desired emission spectra in a phosphor having a moisture-sensitizing coating applied by an oxygen-ozone process.

DISCLOSURE OF THE INVENTION

It is, therefore, an object of the present invention to obviate the disadvantages of the prior art.

It is another object of the present invention to produce electroluminescent phosphors having a commercially desirable emission spectra with very long life and high brightness.

This invention achieves these and other objectives, in one aspect of the invention, by providing a process for making an electroluminescent phosphor having a given emission spectra A, which comprises the steps of manufacturing a beginning electroluminescent phosphor having an emission spectra B, different than A. This beginning phosphor has applied thereto a coating to increase the resistance of the beginning phosphor to the deleterious effects of moisture while simultaneously changing the emission spectra of the beginning phosphor from B to emission spectra A. The process is water-free and comprises reacting a coating agent with a coating precursor and a mixture of oxygen and ozone.

In accordance with one aspect of the invention, there is provided a process for making an ZnS:Cu electroluminescent phosphor having a given emission spectra A that has a CIE y value between 0.230 and about 0.200, comprising the steps of: manufacturing a beginning electroluminescent phosphor having an emission spectra B that has a CIE y value of about 0.250, applying a coating to said phosphor having said emission spectra B to change the emission spectra of said phosphor to emission spectra A, said application of said coating including the steps of reacting trimethylaluminum with a mixture of oxygen and ozone.

Utilization of this method not only provides a phosphor with a desired emission and moisture protection, but, surprisingly, greatly increases the life.

BEST MODE FOR CARRYING OUT THE INVENTION

For a better under understanding of the present invention, together with other and further objectives, advantages and capabilities thereof, reference is made to the following disclosure and appended claims.

This invention provides a process for producing an electroluminescent phosphor that has a commercially desirable emission spectra, moisture protection, long life and high brightness. The invention is especially suited for zinc sulfide, copper activated phosphors or other zinc sulfide phosphors where copper is a co-activator, for example, with chlorine.

Referring now to TABLE I, in addition to the previously mentioned prior art phosphor coated by a TMA/water process (Sample Number CJ 564), there are shown control phosphors having Sample Numbers of ELB849, ELB875, and ELB826. These are standard, uncoated, commercially available phosphors (all having essentially the same composition but coming from different lots) having desired color emission with an X coordinate of about 0.160 and a Y coordinate of about 0.200, which provides a blue-green emission. The small variances shown by the color coordinates are well within commercial tolerance specifications.

However, when these materials are coated by the aforementioned oxygen/ozone process a decided color-shift takes place which is represented by a noticeable change in the Y coordinate. These materials are designated, in TABLE I, by Sample Numbers TH54, which is a coated version of ELB849; TH111, a coated version of ELB875; and TH53 and TH36, which are coated versions of ELB826 differing only in the amount of the coating. Even though the coated materials have increased life and improved brightness, the color-shift makes them unacceptable to many customers.

TABLE I

| Sample Number | Type | Al. wt. % | Emission Color X | Y | Light Output (Foot Lamberts) 2 Hr. | 24 Hr. | 100 Hr. | Life Hrs to ½ 24 Hrs | Efficacy hrs/watt |
|---|---|---|---|---|---|---|---|---|---|
| ELB849 | 813 | NA | 0.160 | 0.203 | 13.6 | 10.0 | 6.2 | 142 | — |
| TH54 | NE600 | 3.9 | 0.156 | 0.169 | 9.2 | 7.9 | 6.7 | 288 | 3.2 |
| ELB875 | 83 | NA | 0.161 | 0.213 | 16.1 | 12.1 | 7.9 | — | — |
| TH111 | TNE600 | 2.6 | 0.158 | 0.178 | 12.0 | 10.2 | 7.4 | 157 | 2.6 |
| ELB826 | 813 | NA | 0.159 | 0.202 | 16.2 | 12.2 | 7.8 | 141 | 1.9 |
| TH53 | TNE600 | 2.7 | 0.157 | 0.177 | 11.0 | 9.2 | 6.9 | 213 | 3.3 |
| TH36 | NE600 | 3.9 | 0.157 | 0.175 | 8.5 | 8.0 | 6.3 | 288 | 3.6 |
| CJ564 | 60 | 4.4 | 0.158 | 0.199 | 10.8 | 9.1 | 6.6 | 195 | 3.4 |

Accordingly, this problem has been solved by a process for making an electroluminescent phosphor having a given emission spectra A, which comprises first, manufacturing a beginning electroluminescent phosphor having an emission spectra B, different than A. This beginning phosphor has applied thereto a coating to increase the resistance of the beginning phosphor to the deleterious effects of moisture while simultaneously changing the emission spectra of the beginning phosphor from B to emission spectra A. The process is water-free and comprises reacting a coating agent with a coating precursor and a mixture of oxygen and ozone.

In particular, a beginning ZnS:Cu phosphor was prepared by increasing the normal amount of copper contained therein, from 0.032 wgt. % to 0.039 wgt. % (as determined by atomic absorption analysis). This is a significant increase and raised the Y coordinate to about 0.250 while leaving the X coordinate substantially unaffected.

Generally, the phosphor composition of this invention was prepared from materials as follows:

| Material | Test Batch |
|---|---|
| ZnS (unactivated S-10) | 25 lbs |
| CuSO$_4$ (anhydrous) | 11.3 g |
| BaCl$_2$ | 341 g |
| MgCl$_2$ (dried) | 341 g |
| NaCl | 227 g |
| Sulfur (sublimed) | 2 lbs |
| ZnO (K-25) | 56.5 g |

The beginning phosphor was produced from the above-cited materials by the standard method of heating the zinc sulfide in a furnace to an elevated temperature in the presence of the copper activator and halide fluxes to achieve an electroluminescent phosphor, cooling the phosphor to ambient temperature and washing the phosphor to remove the flux. The resulting ZnS:Cu phosphor was then dried. Phosphors created by this method are generally known. One such phosphor, having 0.032 wgt. % copper, is a Type 813 electroluminescent phosphor (ZnS:Cu) available from Osram Sylvania, Inc., Towanda, Pa.

The phosphor was coated by the method disclosed in co-pending patent application Ser. No. 09/585,221, the teachings of which are hereby incorporated by reference. In particular, two 3.5 kg samples of modified Type 813 (i.e., a phosphor having an increased amount of copper), Lot ELB478-50, (see TABLE II) were treated with trimethylaluminum and oxygen/ozone in a 2" diameter fluid bed at 180° C. with variation in the amount of aluminum deposited. During the coating treatment of run TH92, 50 g of a thin-coated sample were collected from the fluid bed reactor and labeled as TH92A. Also, a standard Type 60 production lot (CJ30) which is a Type 813 phosphor treated with TMA/H$_2$O coating process is included in TABLE II for comparison. While the flow rates of nitrogen through the TMA container were maintained at 0.75 l/minute, rates of nitrogen flow at the bottom of the reactor were kept at a total of 3.75 l/minute. Also, the oxygen/ozone gas mixture was transported into the reaction vessel at a flow rate of 4.6 l/minute. The resulting data on the coated phosphors are shown in TABLE II.

TABLE II

| Sample Number | Type | Al Wt. % | Emission Color X | Y | Light Output (Foot Lamberts) 2 Hr. | 24 Hr. | 100 Hr. | Life Hrs to ½ 24 Hrs | Efficacy hrs/watt |
|---|---|---|---|---|---|---|---|---|---|
| ELB478-50 | 813 Modified | NA | 0.168 | 0.254 | 19.8 | 19.0 | 15.3 | 497 | 1.17 |
| TH92A | WNE600 | 2.0 | 0.165 | 0.229 | 14.8 | 15.0 | 14.0 | 463 | 2.49 |
| TH92 | TNE600 | 2.8 | 0.166 | 0.225 | 12.4 | 12.7 | 11.8 | 804 | 2.61 |
| TH93 | NE600 | 4.1 | 0.164 | 0.211 | 10.3 | 10.8 | 10.2 | −1295 | 2.79 |
| CJ30 Standard | 60 | 4.0 | 0.161 | 0.203 | 12.3 | 10.7 | 7.9 | 256 | 3.20 |

As can bee seen from Table II, the lamp results indicated that the new WNE/TNE/NE600 products made from the modified Type 813 phosphor have significantly better brightness and tremendously longer life than those of current products. For example, the initial brightness at 24 hours of TH92A (WNE600) lamp was measured at 15 foot lamberts, which is 40% greater than that obtained with the standard CJ30 lot that was prepared by the TMA/H$_2$O process. Also, the half-lives of the lamps were enhanced more than 150%, for example, 256 hours with the standard lot CJ30 versus 663 hours with Lot TH92A. As usual, the greater the amount of aluminum deposit, i.e. the greater the coating thickness, the longer the half-life. Most impressively, and surprisingly, the half-life of TH93 (NE600) with a coating weight of 4.1% aluminum, was estimated at 1295 hours which is about five times the 256 hours of the standard DJ30 lot.

Thus there is provided a process for producing an electroluminescent phosphor with an increased efficiency, great life expectancy and desirable emission spectrum.

While there have been shown and described what are at present considered the preferred embodiments of the invention, it will be apparent to those skilled in the art that various changes and modifications can be made herein without departing from the scope of the invention as defined by the appended claims.

What is claimed is:

1. A process for making an ZnS:Cu electroluminescent phosphor having a given emission spectra A that has a CIE y value between 0.230 and about 0.200, comprising the steps of: manufacturing a beginning electroluminescent phosphor having an emission spectra B that has a CIE y value of about 0.250, applying a coating to said phosphor having said emission spectra B to change the emission spectra of said phosphor to emission spectra A, said application of said coating including the steps of reacting trimethylaluminum with a mixture of oxygen and ozone.

2. The process of claim 1 wherein the emission spectra A and the emission spectra B have a CIE x value of about 0.160.

3. The process of claim 1 wherein the phosphor contains from 0.032% to 0.039% copper by weight.

* * * * *